UNITED STATES PATENT OFFICE.

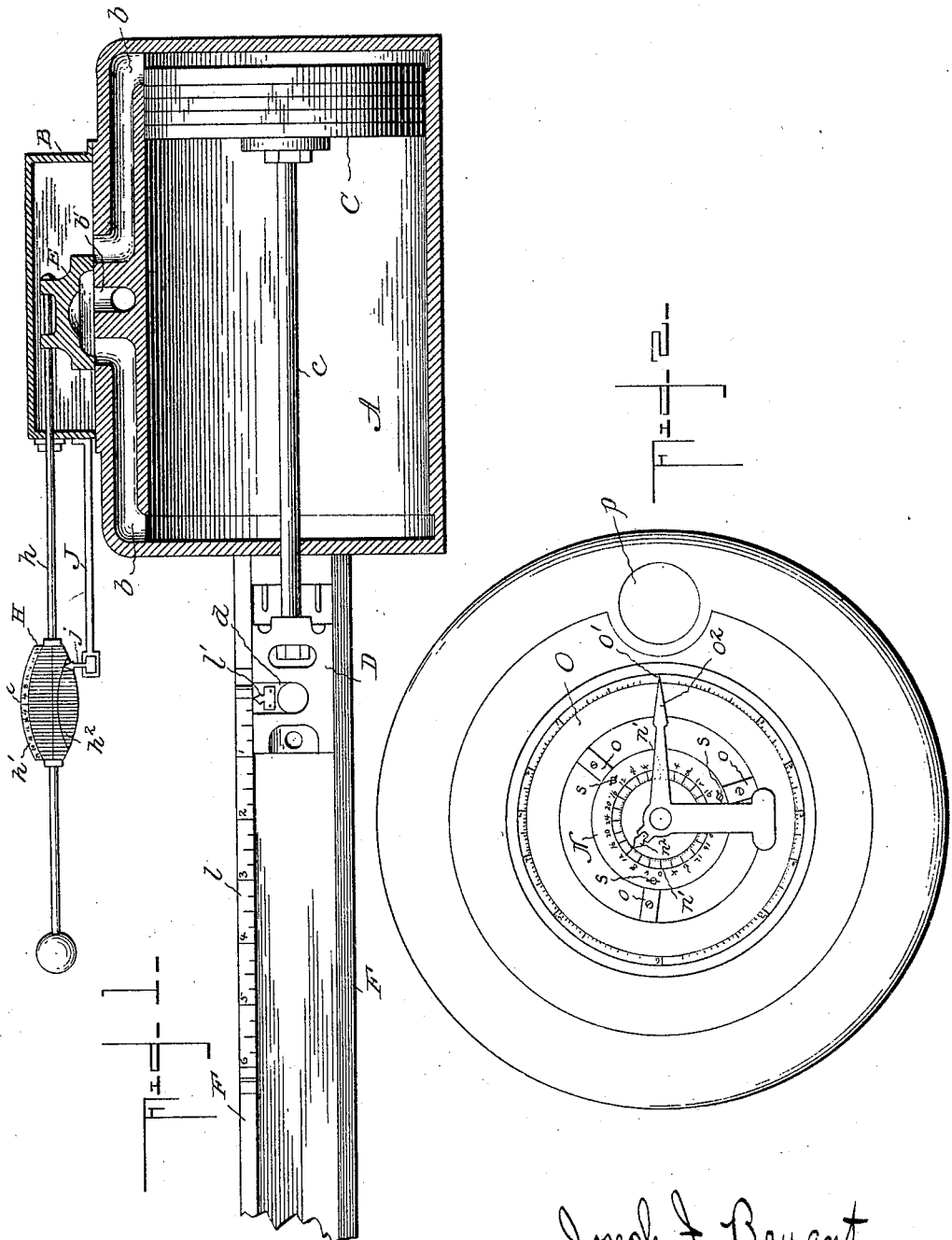

JOSEPH I. BRYANT, OF LOUISVILLE, KENTUCKY.

GAGE FOR STEAM-ENGINES.

No. 799,531.     Specification of Letters Patent.     Patented Sept. 12, 1905.

Application filed July 6, 1904. Serial No. 215,554.

*To all whom it may concern:*

Be it known that I, JOSEPH I. BRYANT, a citizen of the United States, residing at Louisville, in the county of Jefferson and State of Kentucky, have invented a Gage for Steam-Engines, of which the following is a specification.

The object of this invention is to provide the operative parts of a steam-engine with gages so arranged and disposed with reference to such parts as to accurately determine the proper movement of the said engine parts, whereby adjustments may be made in taking up for wear or for other purposes.

Other objects and advantages of the invention will hereinafter appear, and what I claim as novel in the art and desire to secure by Letters Patent is more specifically set forth in the appended claim.

In the accompanying drawings, which form a part of this specification, Figure 1 is a sectional view of a steam-engine, including the cylinder and parts carried thereby, and showing the application of my gages thereto. Fig. 2 is a side elevation of the gages which are carried by the crank-shaft and including the pointers properly arranged and supported with respect to said gages.

Though I have herein illustrated my invention as applied to a steam-engine of the slide-valve type, it will be obvious that only a slight modification in the gages would permit of their application to other types of engines, and at the outset, therefore, I do not wish to be understood as limiting the invention in this particular.

Referring to the drawings, in which the conventional type of slide-valve engine is shown, the letter A designates the cylinder; B, the valve-case; C, the piston connected by rod $c$ to the cross-head D, and E the slide-valve, the latter being located in the valve-casing and operating over the inlet and exhaust-ports $b$ $b$ and $b'$, respectively, as is usual. The cross-head travels between the guides F F and is adapted for the connection thereto of the rod which connects with the crank-shaft.

The parts just described are common in all steam-engines of this particular type, and it is the purpose of my invention to provide means for facilitating the adjustment of these parts by accurately testing or indicating their relative operations.

In carrying out my invention I provide the slide-valve E with means for indicating the travel of the same, as well as the wear and location of same. To this end the rod $h$ is attached to the slide-valve to travel therewith and extends through the valve-casing, beyond which latter it is provided with a plate H, having graduations $h'$, such graduations extending in opposite directions from a central point or zero-mark, as $i$, and over this plate operates an indicator finger or pointer $j$, attached to a stationary rod J, secured to the valve-casing. The gage-plate H is preferably oval in shape, as shown, and the graduations are disposed along one edge, and in addition to these graduations the face of the plate is provided with gage-lines $h^2$.

These gage devices will accurately show the extent of travel of the slide-valve, being indicated by the pointer $j$ in connection with the graduations on the plate H, and the travel of the pointer over the plate as the latter operates with the slide-valve will show any variations in the movement of the vlave, as well as indicate wear.

To provide for accurately determining the travel of the piston and with relation to the movement of the valve, a graduated scale, as $l$, is attached to one of the guides F, and the cross-head is provided with a recess, as $d$, in which is located and attached an indicator finger or pointer $l'$, adapted to travel over the graduated scale as the cross-head moves back and forth. I also purpose to provide the crank-shaft with a circular graduated scale N, which turns therewith, the graduations of this scale extending in opposite directions from two zero-points, as $n'$ $n'$, which latter are located diametrically opposite each other, and attached to this circular scale N by arms $o$ is a larger circular scale O, the graduations of which extend in opposite directions from a single zero-point, as $o'$. In connection with these scales N and O are stationary indicators or pointers $n^2$ and $o^2$, respectively, and adapted to operate over said scale-plates as the latter are turned with the crank-shaft.

The larger scale-plate O is employed in connection with the scale-plate on the cross-head guides, while the smaller scale-plate N is employed in connection with the scale-plate H, over which latter the pointer carried by the slide-valve travels. The scale-plate N is arranged with respect to the usual eccentric which operates the slide-valve.

In operation when all the parts of the engine are properly adjusted and there is no wear or lost motion the movement of the piston and corresponding movement of the cross-head carries the pointer $l'$ on the latter along the scale-plate $l$, and the pointer $o'$, Fig. 2, travels correspondingly over the circular scale-plate O, so that on either stroke of the piston should the same be stopped at any intermediate point the pointers $l'$ and $o'$ would be at exactly the same points on their scale-plates $l$ and O, respectively. The pointers $j$ and $n^2$ would also correspondingly travel over their scale-plates and show that the connections for the slide-valve were properly adjusted. Now supposing the brasses or bushings at the crank-pin $p$ are worn sufficiently to cause a lost motion at this point, in such an event the pointer on the cross-head would show an advance movement over the travel of the pointer $o'$, and if the brasses or bushings were unevenly worn such advance would be greater on one stroke of the piston, and of course this would indicate exactly the amount of wear on each brass or bushing. In the same way the gages would indicate any wear on the cross-head connections, in which latter event the pointer $o'$ would show an advance movement over the pointer on the cross-head. In each case the difference in the relative position of the pointers will indicate the amount of wear. Similarly, any wear on the connections between the slide-valve and eccentric would be indicated by the gages H and N, while the gage H will also show the amount of wear on the slide-valve itself.

The practical advantages of the gage devices herein shown and described will be apparent, and it will be seen that such devices provide an accurate test as to the individual and relative movements of the working parts of the engine, and therefore serve to greatly facilitate the adjustment of such parts with relation to each other.

To provide for a slight adjustment of the scale-plates, the screws $s$, by which they are connected to each other, pass through slots in the scale-plate N, as shown.

Having thus described my invention, what I claim as new, and desire to secure by patent, is—

In a gage for steam-engines, the combination, of a scale-plate and pointer, one being stationary and the other carried by a reciprocating part of the engine, a circular scale-plate attached to and rotatable with the crank-shaft, and a stationary pointer coöperating with said circular scale-plate, whereby the aforesaid scale-plates and pointers together indicate and locate any wear on the connections between the engine and crank-shaft, as herein shown and described.

In testimony whereof I have signed my name to this specification in the presence of two subscribing witnesses.

JOSEPH I. BRYANT.

Witnesses:
   JNO. HURST,
   JOSEPH B. BRYANT.